United States Patent [19]

Schwartz et al.

[11] Patent Number: 4,698,683
[45] Date of Patent: Oct. 6, 1987

[54] VIDEO CONVERSION KIT FOR PROJECTORS

[76] Inventors: Morris Schwartz, 6455 La Jolla Blvd., La Jolla, Calif. 92037; Edward K. Kaprelian, 15 Lowery La., Mendham, N.J. 07945

[21] Appl. No.: 890,106

[22] Filed: Jul. 28, 1986

[51] Int. Cl.⁴ .............................................. H04N 3/36
[52] U.S. Cl. ..................................... 358/214; 358/54
[58] Field of Search ................ 358/54, 102, 209, 214, 358/215

[56] References Cited

U.S. PATENT DOCUMENTS

| | | | |
|---|---|---|---|
| 3,456,073 | 7/1969 | Burton | 358/214 |
| 3,718,760 | 2/1973 | Patels et al. | 358/214 |
| 4,331,979 | 5/1982 | Bendell | 358/209 |
| 4,349,836 | 9/1982 | Sawano | 358/102 |

*Primary Examiner*—James J. Groody
*Assistant Examiner*—Michael D. Parker

[57] ABSTRACT

A kit for converting a conventional slide or motion picture projector to a closed circuit television device primarily for classroom, seminar and home entertainment use, consisting of two main modules: a new lamp which substitutes for the normal projection lamp, and a lens-video camera combination which takes the place of the normal projection lens. The features and characteristics of the projector itself remain unchanged. The signal from the lens-television module can be viewed on a video screen, or recorded on a video recorder with or without modification by accessory components.

12 Claims, 8 Drawing Figures

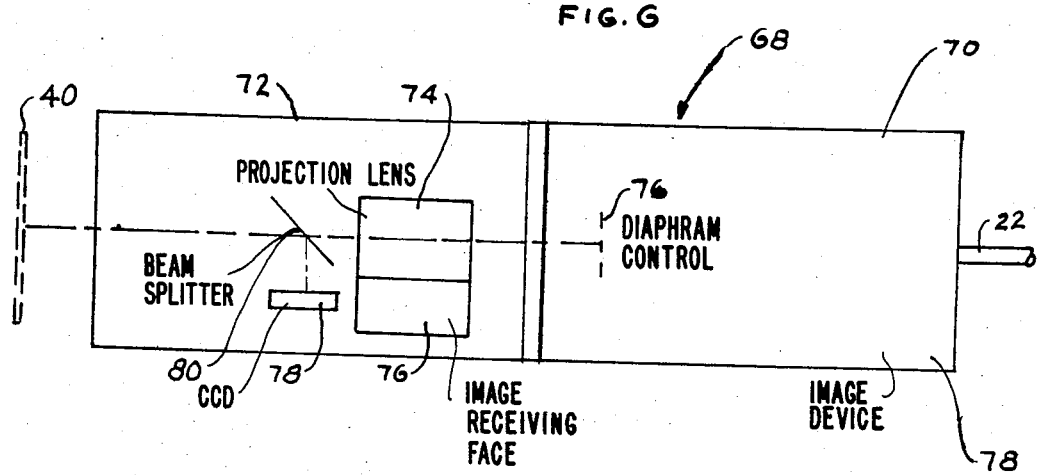
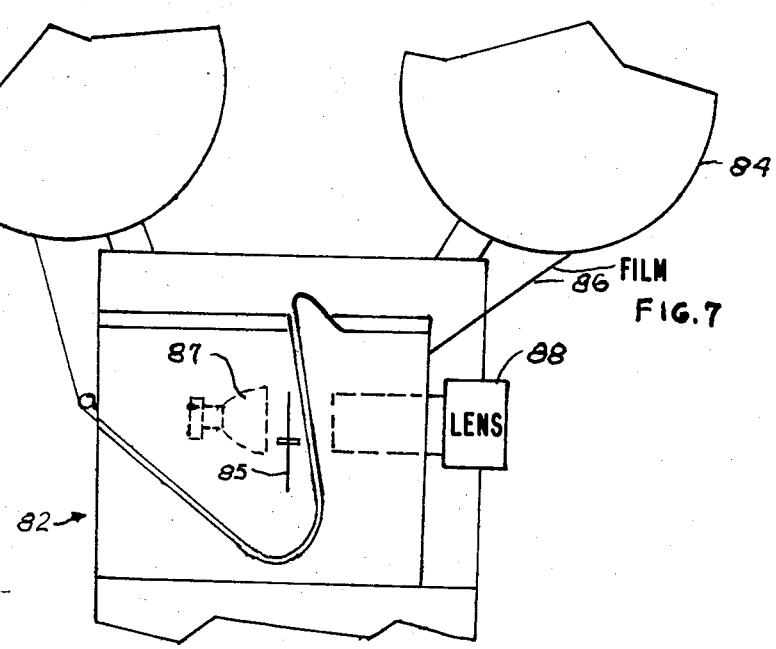
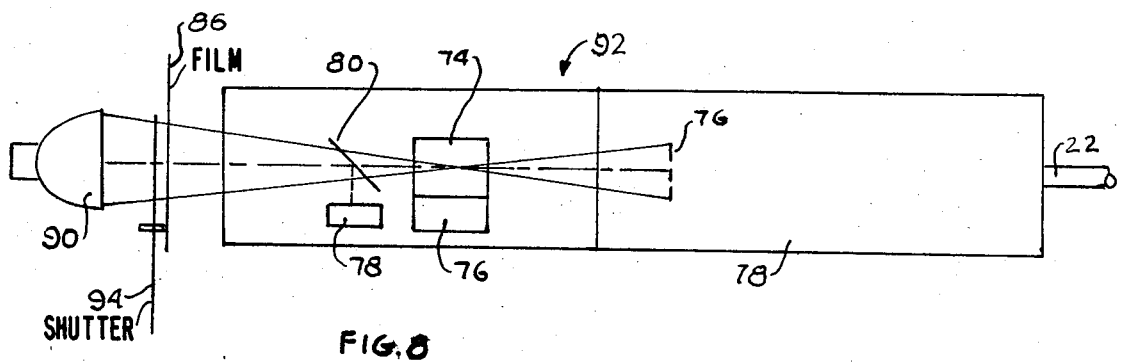

VIDEO CONVERSION KIT FOR PROJECTORS

BACKGROUND OF THE INVENTION

1. Field of the Invention

This invention relates to the displaying on a television screen the images on photographic transparencies and motion picture films and is more particularly directed to a conversion kit for adapting a conventional slide or motion picture projector to allow slide or motion picture film viewing on a television or monitoring screen, recording on a video cassette recorder, or modifying the slide or motion picture images by electronic means.

2. Description of the Prior Art

The prior art shows several slide projectors for showing photographic images on a television screen. U.S. Pat. No. 3,456,073 shows a closed circuit television camera system which projects motion picture film via a television receiver using a flying spot scanner to convert the motion picture to electronic form. U.S. Pat. No. 4,349,836 employs a special projector for viewing microfilm on a television display. German patent DE No. 30 10 177 shows an arrangement for scanning a slide for presentation on a television screen as does U.S. Pat. No. 4,331,979.

Each of these uses a special projector arrangement in connection with video pickup means for providing the electronic signal for the video receiver. Their disadvantage is that they are generally too costly and complex, are dedicated to a single purpose use and are not available to the average picture taker.

SUMMARY OF THE INVENTION

The primary object of this invention is to provide a conversion kit for adapting a conventional slide or motion picture projector for displaying slides or film on a television screen. Another object is to allow for recording these images on a video cassette recorder and to provide oral commentary, sound effects or music background, especially in connection with stationary slide projection as "fill-in" time between slide changes. Still another object is to provide for electronic manipulation of the image.

Still another object is to provide a slide or motion picture projector which protects color slides or films from fading, especially with frequent projection, by reducing the amount of light and heat passing through the slide.

Still another object is to allow the user to view slides or films without having to set up a screen and to darken the room and without having to move and orient a projector for its proper screen position.

In accordance with this invention, the conversion of a standard slide or motion picture projector into a closed circuit television system requires the replacement of the normal projection lamp with one of lower light output and further requires the replacement of the conventional projection lens with a lens-video pickup module in which the lens in the module reproduces the slide or film to be viewed on the light responsive surface of the tube such as a vidicon or newvicon or the charge-coupled device such as an MOS sensor, MOS structure or other video sensor.

BRIEF DESCRIPTION OF THE DRAWING

FIG. 6 is a diagrammatic view of the imaging module or lens-video pickup module for a slide projector.

FIG. 7 is a diagrammatic view of a motion picture projector intended for conversion in accordance with the provisions of the invention.

FIG. 8 is a diagrammatic view of the imaging module or lens-video pickup module for a motion picture projector.

As shown in FIG. 1. a slide projector 10 converted for use with a video receiver 12 consists of a projector body 14 carrying a slide magazine 16 and provided with lamp module 18 and imaging module 20. The output of the imaging module can be fed to the video receiver either directly via a coaxial cable 22 and modulator 24 or indirectly via a video cassette recorder 26. A special effects unit 28 such as a video enhancer for improving picture detail, a color processor for restoring or altering color in the image, special effects generator for creating patterns or borders, titler or stabilizer in this indirect circuit can be used in the direct circuit as well, via a switcher, for modifying the imaging.

Figure 1:
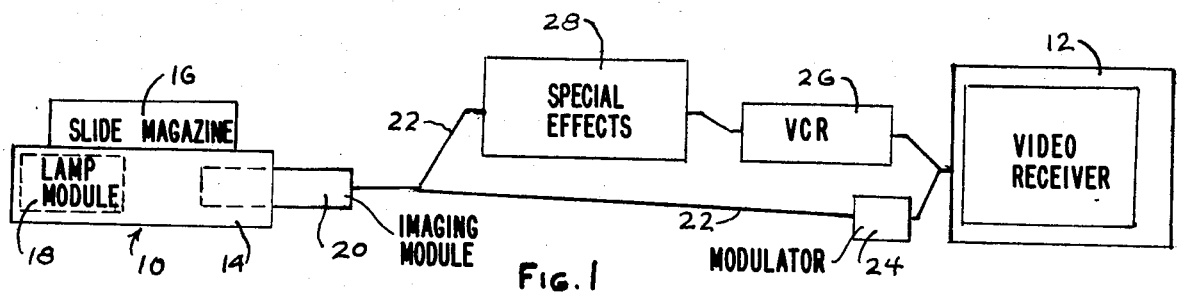
FIG. 1 is a diagrammatic view of a slide projector conversion in accordance with the invention.
Figure 2:
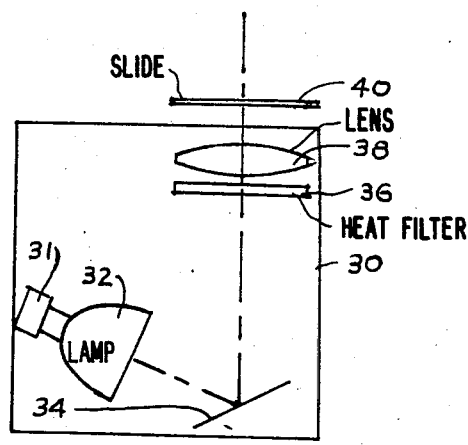
FIG. 2 is a plan view of a conventional lamp and condenser unit from a slide projector.

The lamp and condenser unit 30 of FIG. 2. is typical of that used in such slide projectors as the Kodak Ektagraphic ® and consists of a lamp socket 31, a lamp 32 with integral reflector 34, heat filter 36 and condenser lens 38. This group of components sends light through slide 40 and into a projection lens, not shown. In normal use the optical train comprising the lamp, mirror, heat filter, condenser lens, slide and projection lens projects an image of the slide on a suitable screen.

Figure 3:
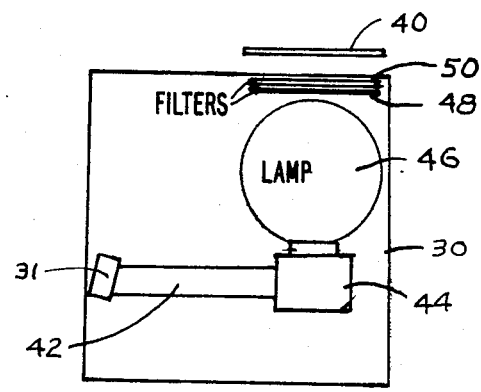
FIG. 3 is a plan view of a lamp conversion module used to replace the lamp and condenser unit of FIG. 2.

One arrangement for converting the lamp and condenser unit for use in this invention is shown in FIG. 3. Here, the original lamp, mirror, heat filter and condenser lens are removed and stored for future re-conversion of the unit for conventional slide projection. An extension arm 42 plugs into built-in lamp socket 31 and carries at its other end a socket 44 for accepting a lamp 46. Lamp 46 is of the light diffusing type and has a diameter somewhat exceeding the diagonal of slide 40, thus obviating the need for condenser and assuring uniform slide illumination because of the optical characteristics of the white or "milk" glass envelope. Optical neutral density and color temperature filters 48 and 50 can be used respectively to control overall illumination level and to increase the color temperature of the lamp in order to enhance the blue end of the spectrum, a desirable arrangement especially with longer life lamps having somewhat lower tungsten filament temperatures. Additional color adjustment can be achieved by using the color controls on the video camera. It is also possible to use lamp 46 in the conversion module of FIG. 3 without removing condenser lens 38; filters 48 and 50 would replace original heat filter 36.

Figure 4:
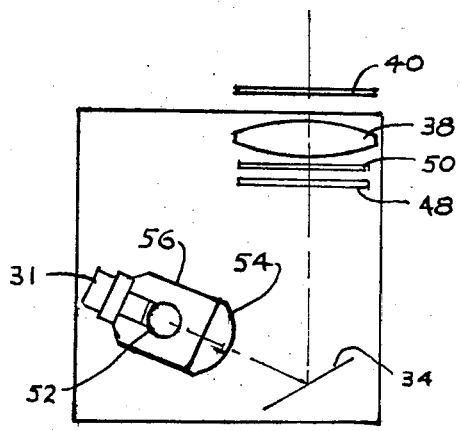
FIG. 4 is a plan view of another lamp conversion module for replacing the lamp and condenser unit of FIG. 2.

FIG. 4 shows an alternate arrangement for the lamp module in which a low wattage lamp 52 of about 6 to 15 watts with a clear envelope, and new condenser 54 held together by frame 56 plugs into lamp socket 31. The combination of lamp 52 and condenser 54 produce nearly-parallel light, similar to that produced by original lamp-reflector 32, which is then focused by original condenser 38 onto the slide and lens.

Figure 5:
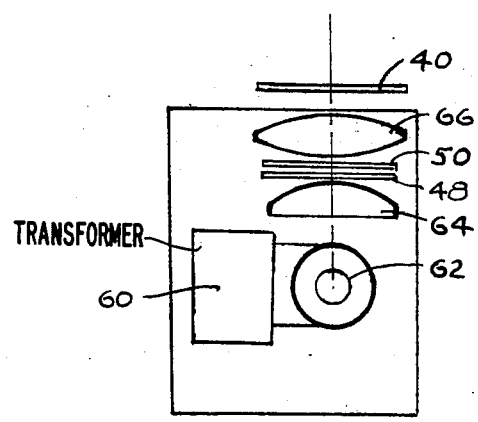
FIG. 5 is a plan view of a lamp conversion module for another type of slide projector.

Because there are a large number of slide projectors such as The Kodak Carousel ® in existence which use an earlier illuminating system comprising a lamp, a pair of condensers and a heat filter, an arrangement such as shown in FIG. 5 is used for the conversion module for these projectors. Here the usual line voltage lamp of 250 to 750 watt power is removed and in its place is substituted a conversion socket, a transformer 60 for reducing the projector voltage to approximately 6 or 12 and carrying a conversion socket, and a low wattage lamp 62. Lamp 62 can be any one of a number of lamps used in automotive or indicator service such as G.E. 93 or G.E. 1129. Light from the lamp passes through condensers 64 and 66 already in the projector and through slide 40. Color balance filters 48 and 50 replace the heat filter with which the projector is normally equipped. It should be understood that the conversion kits can be modified to fit projectors other than those mentioned.

In FIG. 6 the imaging module shown generally at 68 comprises a body 70, one end 72 of which is cylindrical in shape and is of a dimension which allows it to be inserted into the projection lens receiving cavity of the projector. Focusing of the imaging module can be accomplished readily by using the projector's own built-in focusing arrangement. Within portion 72 is a projection lens 74 which receives light passing through slide 40 from any one of the lamp modules of FIGS. 2, 3, 4, or 5 and focuses the image of the slide on the image receiving face 76 of the charge coupled device or other image device 78, which converts the image into a video signal for transmission by coaxial cable 22 to video receiver 12.

Light level control for any imaging device 78 which does not contain automatic internal light control is accomplished, preferably, by a variable diaphragm, not shown, in lens 74 which is adjusted by a diaphragm control mechanism 76 of the galvanometer or other type. The light responsive cell 78 which powers the diaphragm control mechanism receives light from the slide via a beam splitter 80.

FIG. 7 shows a partial view of a typical motion picture projector 82, for example a 16 mm Kalart Victor model 90, although any home movie projector in an 8 mm, super 8 mm or 16 mm size would be equally adaptable to the purpose of this invention. The projector is provided with reels 84 which carry the film 86 being projected. The film is fed through the projector by the usual pull-down mechanism past a three-bladed shutter 85 and a film gate where it is illuminated by the usual 200 to 250 watt lamp 87; projection of film 86 is onto a screen via lens 88.

FIG. 8 shows the conversion kit for transforming the cine projector into a closed circuit video system. In place of lamp 86 there is substituted a low voltage lamp 90 preferably having a power of 10 to 15 watts. The normal projection lens is replaced by a lens-video pickup module 92 which is similar to the module of FIG. 6. Module 92 includes a beamsplitter 80, cell 78, diaphragm control 78, beam splitter 80 and video pickup 78 having an image receiving face 76, all serving the same function as in FIG. 6. The kit also includes a replacement five-bladed shutter 94 to match the motion picture frame rate to video.

We claim:

1. A conversion kit for converting a conventional projector having an illumination system including a lamp of given power, a film and slide handling section and a projection lens into a projector for selectively coupling to either a video recorder or to a television receiver, comprising a first module consisting of a replacement illumination system including a lamp of lower power, and a second, imaging module which replaces the projection lens and which includes an electronic imaging device which receives on its light sensitive surface an image of a film in the film handling section via a relay lens between said film and said light sensitive surface, and means for selectively transmitting the electrical signals from the imaging device to either of said video recorder or a said television receiver.

2. A conversion kit as claimed in claim 1 the lamp of said replacement illumination system having a light diffusing envelope the diameter of which is greater than the diagonal of the slide being imaged.

3. A conversion kit as claimed in claim 2 the replacement illumination system including one or more neutral density light filters for establishing the level of light illuminating the slide.

4. A conversion kit as claimed in claim 2, the replacement illumination system including one or more color filters for establishing the color temperature of the light illuminating the slide.

5. A conversion kit as claimed in claim 1, the lamp of said replacement illumination system cooperating with a condenser lens which focuses light passing through the film into the entrance pupil of the relay lens.

6. A conversion kit as claimed in claim 1, said imaging module being movable relative to the film to provide for focusing the image of the film onto the light sensitive surface.

7. A conversion kit as claimed in claim 1, the lens of said imaging module being provided with light responsive means to alter its relative aperture in response to the optical density of the film.

8. A conversion kit as claimed in claim 1, said imaging device consisting of a charge coupled device.

9. A conversion kit as claimed in claim 1, said imaging device consisting of any one of a vidicon tube, newvicontube or MOS sensor.

10. A conversion kit as claimed in claim 1, said means for transmitting the electrical signals consisting of a modulator connected to the electronic imaging device and a length of coaxial cable connecting the imaging device to a television receiver.

11. A conversion kit as claimed in claim 1, said means for transmitting the electrical signals consisting of a length of coaxial cable connecting the imaging device to said video recorder.

12. A conversion kit as claimed in claim 1, said transmitting means including a special-effects component for modifying the image on the film.

* * * * *